United States Patent [19]
Kusano et al.

[11] Patent Number: 5,206,848
[45] Date of Patent: Apr. 27, 1993

[54] OPTICAL DISK PLAYER HAVING TILT SERVO CONTROL ABSENT TILT SENSOR

[75] Inventors: Satoshi Kusano; Shinichi Takahashi; Toshio Suzuki; Yuji Tawaragi; Noriko Obitsu, all of Tokorozawa, Japan

[73] Assignee: Pioneer Electronic Corporation, Tokyo, Japan

[21] Appl. No.: 658,752

[22] Filed: Feb. 21, 1991

[30] Foreign Application Priority Data

Jul. 19, 1990 [JP] Japan .................. 2-191450

[51] Int. Cl.$^5$ .................................. G11B 7/09
[52] U.S. Cl. ............................ 369/44.41; 369/44.32
[58] Field of Search .............. 369/58, 44.11, 44.13, 369/44.14, 44.32, 54, 44.41, 44.42, 44.25, 44.33

[56] References Cited

U.S. PATENT DOCUMENTS

| | | | |
|---|---|---|---|
| 4,544,838 | 10/1985 | Musha et al. | 369/44.41 |
| 4,608,680 | 8/1986 | Yano | 369/44.32 |
| 4,744,069 | 5/1988 | Sugiyama et al. | 369/44.41 |
| 4,858,216 | 8/1989 | Kamiya | 369/44.14 |

FOREIGN PATENT DOCUMENTS

| | | |
|---|---|---|
| 0351953 | 1/1990 | European Pat. Off. |
| 0357323 | 3/1990 | European Pat. Off. |
| 01088931 | 4/1989 | Japan |
| 01263951 | 10/1989 | Japan |

Primary Examiner—Aristotelis Psitos
Assistant Examiner—Muhammad Edun
Attorney, Agent, or Firm—Keck, Mahin & Cate

[57] ABSTRACT

An optical disk player provided with tilt servo unit. A quadrant type photodetector is used as disk tilt detecting means, and the push-pull output is issued as a disk tilt detecting signal. By simultaneous use of the photodetector of the pickup, there is no need to use special-purpose tilt sensor, and this contributes to compact design of the pickup and to the reduction of manufacturing cost.

5 Claims, 4 Drawing Sheets

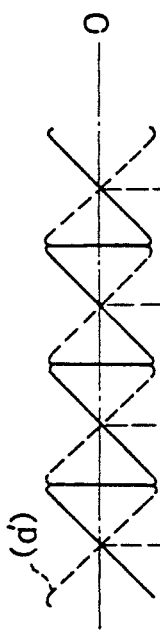
Fig. 4A
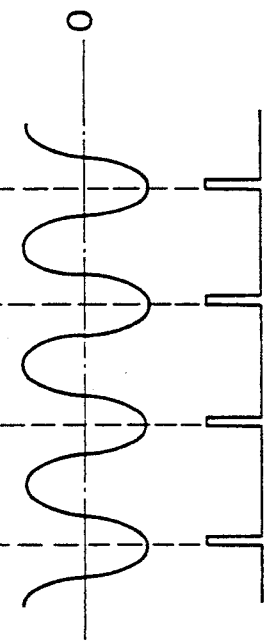
Fig. 4B
Fig. 4C
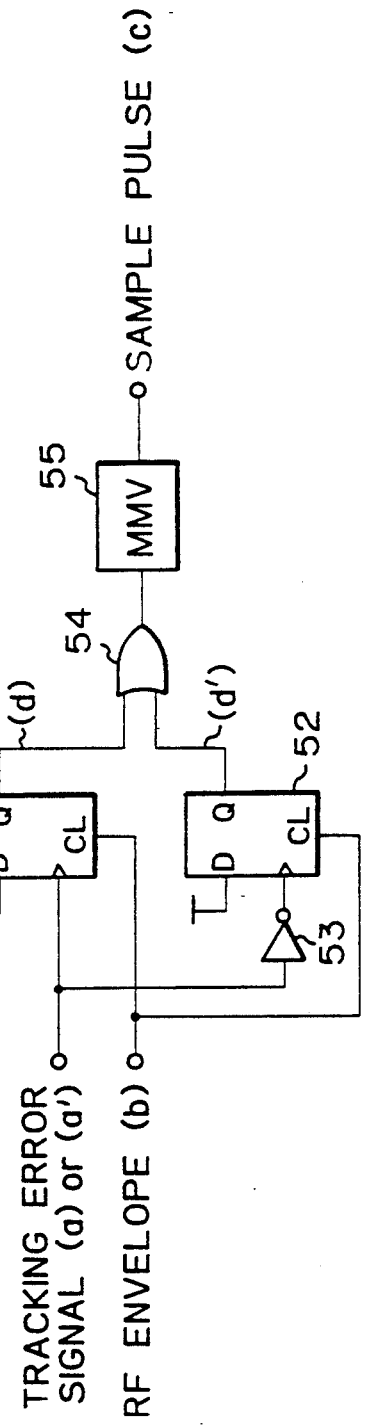
Fig. 5

OPTICAL DISK PLAYER HAVING TILT SERVO CONTROL ABSENT TILT SENSOR

BACKGROUND OF THE INVENTION

1. Field of the invention

The present invention relates to an optical disk player, and more particularly to an optical disk player provided with tilt servo unit.

2. Description of Background Information

In an optical video disk player, when disk-shaped recording medium such as video disk (hereinafter simply referred to as "disk") placed on a turntable is warped, the information recording surface of the disk is tilted relative to the optical axis of the information reading light beam, which is irradiated from the pickup, and coma aberration occurs. As the result, the influence of the adjacent track becomes stronger, and this leads to the increase of crosstalk. To overcome this problem, a tilt servo unit is used, which detects the tilt of the information recording surface relative to optical axis of the information reading light beam by a so-called tilt sensor and controls the tilt of the pickup according to the detected output so that the optical axis of the information reading light beam is kept perpendicular to the information recording surface at all times.

As such tilt servo unit, various arrangements have been proposed in the past. Because all of these arrangements have special-purpose tilt sensors near the pickup, and this hinders compact design for pickup and also means the increased production cost.

SUMMARY OF THE INVENTION

To solve these problems, the object of the present invention is to offer an optical disk player provided with a tilt servo unit, which does not require a tilt sensor for exclusive use, thereby contributing to compact design of the pickup and lower manufacturing cost.

The optical disk player according to the present invention comprises: a pickup provided with an objective lens for converging an irradiated light beam on the information recording surface of the disk and with a photodetector for receiving a reflected light beam from the information recording surface through the objective lens, the objective lens and the photodetector being integrally and movably arranged; a tracking servo unit consisting of a servo loop, including means for generating a tracking error signal, indicating the deviation of the irradiated light beam spot in radial direction of the disk in relation to the recording track of the disk and also means for deviating the irradiated light beam spot in radial direction of the disk according to the tracking error signal; and a tilt servo unit for controlling the irradiated light beam to be perpendicular to the optical axis of the information recording surface according to a disk tilt detecting signal, comprising disk tilt detecting means for obtaining the disk tilt detecting signal by detecting the tilt of the information recording surface in relation to the optical axis of the irradiated light beam, wherein the photodetector consists of a pair of photoelectric conversion elements arranged at least in such manner that it is divided into two parts along the direction of the recording track, and the disk tilt detecting means issues the differential output of the light receiving output of the pair of photoelectric conversion elements when said servo loop is in closed state and issues said disk tilt detecting signal.

In the optical disk player according to the present invention, at least a pair of photoelectric conversion elements divided into two parts along the recording track direction are furnished as the photodetector of the pickup, and the differential output of the light receiving outputs of the pair of photoelectric conversion elements is obtained when the tracking servo loop is in closed state and it is issued as the disk tilt detecting signal.

BRIEF DESCRIPTION OF THE DRAWINGS

FIG. 4 shows the waveforms of a tracking error signal (a), reading RF signal (b), and sample pulse (c);

FIG. 5 and FIG. 6 are block diagrams showing actual arrangements of the sample pulse generating circuits.

DETAILED DESCRIPTION OF A PREFERRED EMBODIMENT

In the following, an embodiment of the present invention will be described in detail with reference to the accompanying drawings.

Figure 1:
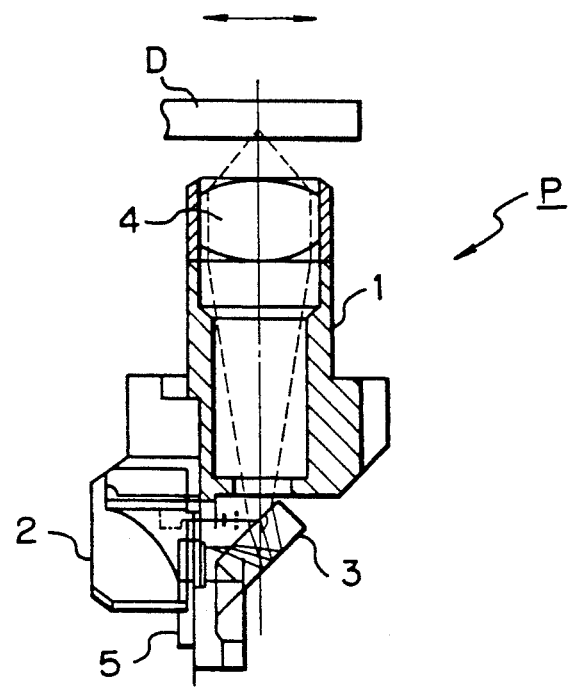
FIG. 1 is a cross-sectional view of an arrangement of the pickup used in the optical disk player of this invention.

FIG. 1 is a cross-sectional view of an arrangement of the pickup P to be used in an optical disk player of this invention. In the body 1 of this pickup P, there are provided a laser light source 2 for emitting laser light beam, a mirror 3 for reflecting this laser light beam in the direction of the disk D, an objective lens 4 for converging the incident light beam on the information recording surface of the disk D, and a photodetector 5 for receiving the reflected light beam from the disk D through the objective lens 4. Being driven by a tracking actuator (not shown), the body 1 including the objective lens 5 and the photodetector 5 is integrally movable in the radial direction (←→) of the disk. The body 1 is integrally movable in the direction of optical axis by a focus actuator (not shown). Actual arrangement of such pickup P by the present applicant is described in detail in the specification of the Japanese Patent Application No. H2-135726 by the present applicant.

Figure 2:
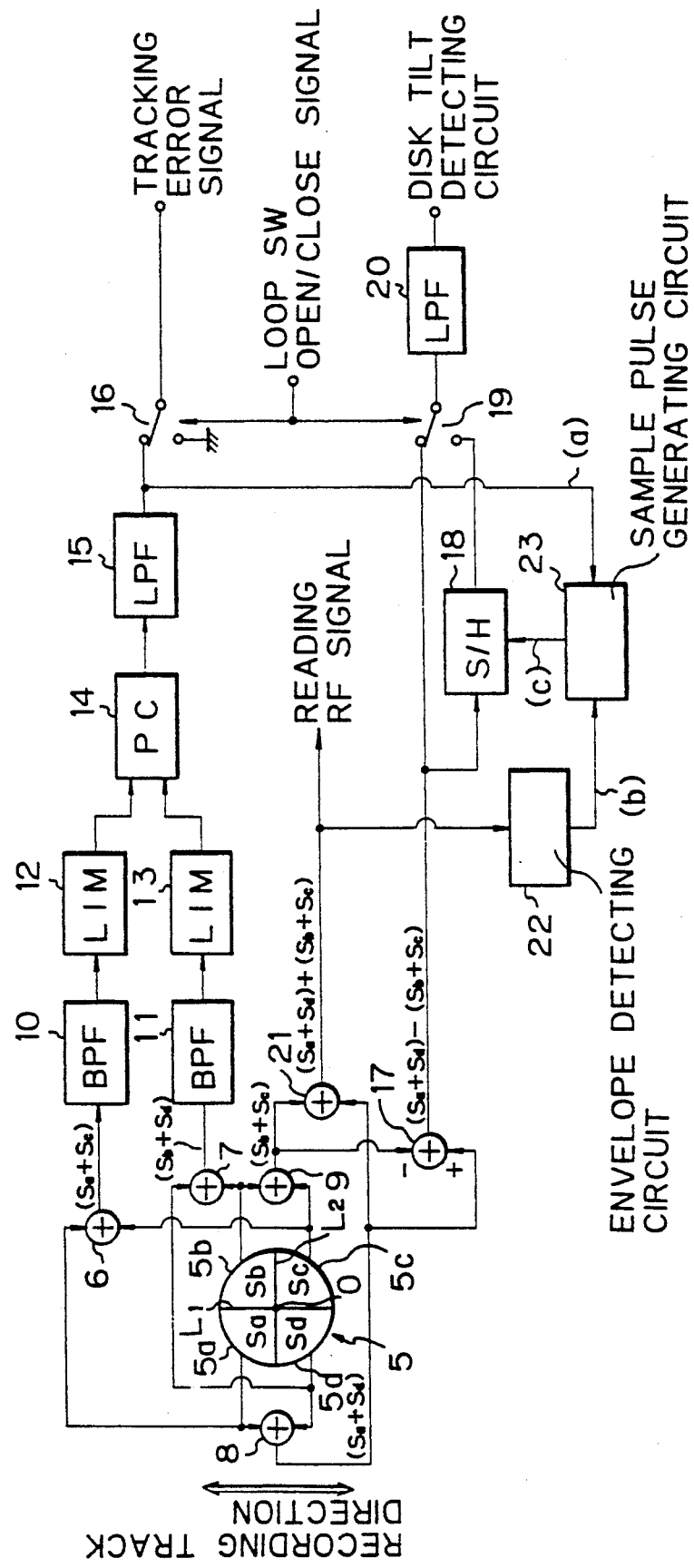
FIG. 2 is a block diagram showing an arrangement of signal processing system of the optical disk player of this invention.

Next, description is given on an arrangement of signal processing system of the optical disk player according to the present invention in connection with FIG. 2.

First, the photodetector 5 incorporated in the pickup P is a so-called quadrant type photodetector comprising 4 photoelectric conversion elements 5a–5d having the light receiving surface divided into four parts by the division line $L_1$ along the tangential direction of the track and by the division line $L_2$ perpendicular to it. It is arranged in such manner that the center O of the light receiving surface coincides with the optical axis of the reflected light beam from the disk D when the tracking state is adequately arranged. Of these 4 photoelectric conversion elements 5a–5d, the outputs Sa and Sc of the photoelectric conversion elements 5a and 5c and the outputs Sb and Sd of the photoelectric conversion elements 5b and 5d disposed on diagonal lines are added by the adders 6 and 7 respectively. Also, the outputs of the sides divided by the division line $L_2$, i.e. the outputs Sa and Sd of the photoelectric conversion elements 5a and 5d, and the outputs Sb and Sc of the photoelectric conversion elements 5b and 5c are added by the adders 8 and 9.

The added outputs (Sa+Sc) and (Sb+Sd) of the adders 6 and 7 are supplied to the phase comparator 14 through BPFs (band pass filters) 10 and 11 and limiters (LIM) 12 and 13. The phase comparator 14 outputs the voltage proportional to the phase difference of these two inputs. The phase difference output of the phase comparator 14 is issued as a tracking error signal through LPF (low pass filter) 15. The polarity and the level of the tracking error signal indicate the deviation direction and the deviation of the information reading beam spot in radial direction of the disk in relation to the recording track of the disk D. This tracking error signal is selectively supplied to the tracking actuator (not shown) by a loop switch 16.

As described above, of the phase difference generated between the outputs of 4 photoelectric conversion elements 5a-5d, the phase variation component, which varies according to the deviation of the information reading beam spot in radial direction of the disk in relation to the recording track, is detected, and the tracking error signal is generated. This is the so-called time difference detection method (the Japanese Patent Application Laid Open No. S57.181433), and this method is advantageous in that it is not adversely affected by the deviation of intensity distribution of the reflected light beam.

Figure 3:
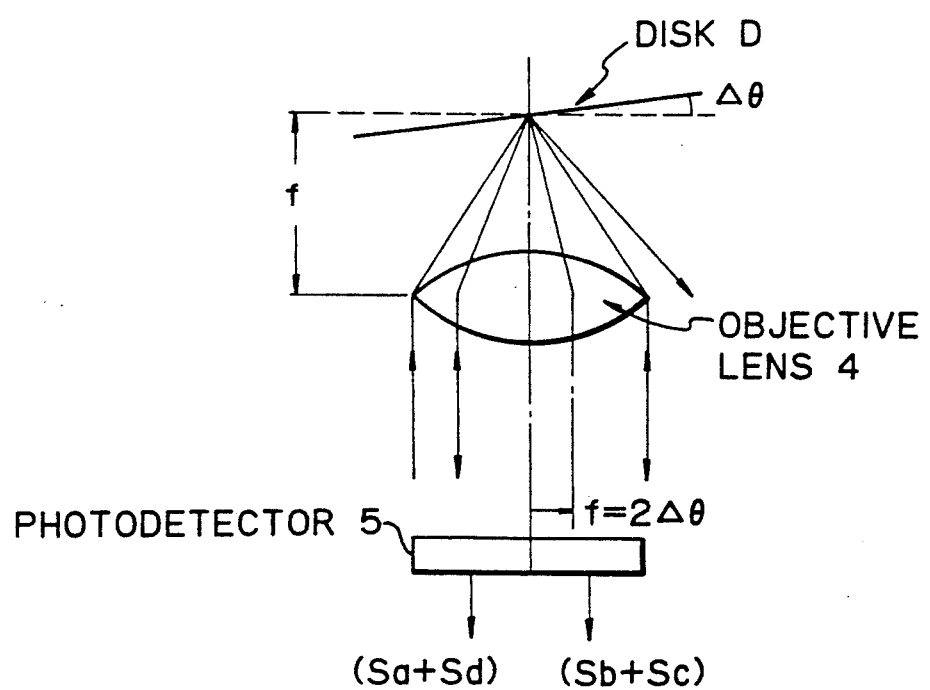
FIG. 3 is a theoretical diagram showing the relationship between the disk tilt and the disk tilt detecting signal.

On the other hand, the added outputs (Sa+Sd) and (Sb+Sc) of the adders 8 and 9 are supplied to the subtractor 17, and the difference between two outputs is obtained This differential output {(Sa+Sd)−(Sb+Sc)} is directly issued as a disk tilt detecting signal when the tracking servo loop is closed. If it is open, the sample hold output by sample and hold circuit 18 is selected by the selection switch and it is issued as the disk tilt detecting signal through LPF 20. This disk tilt detecting signal indicates the tilt of the information recording surface of the disk D to the optical axis of the information reading light beam. Specifically, as shown in FIG. 3, when the disk D is tilted by the angle $\Delta\theta$ from the surface perpendicular to the optical axis of objective lens 4 in the radial direction, the optical axis of reflected light beam is shifted, and the beam spot is also displaced on the light receiving surface of the quadrant type photodetector 5. Accordingly, of 4 photoelectric conversion elements 5a-5d, DC offset corresponding to the tilt of the disk D is generated on the differential output {(Sa+Sd)−(Sb+Sc)} of the sum of the outputs on the sides divided by the division line $L_1$ along the tangential direction of the track. This displacement of the beam spot is $f \cdot 2\Delta\theta$, where f is the distance between the objective lens 4 and the disk D. The disk tilt detecting signal thus obtained is supplied to the tilt actuator (not shown) of the tilt servo mechanism, which controls the optical axis of the information reading light beam to be perpendicular to the information recording surface of the disk D. As the tilt servo mechanism, the one disclosed in the Japanese Utility Model Application Laid Open No. S59-168835 may be used. Thus, the disk tilt detecting signal is used as the driving signal for the tilt motor of the above tilt servo mechanism.

DC offset generated on the outputs {(Sa+Sd)+(Sb+Sc)} is also generated by relative positional division between objective lens 4 and the quadrant type photodetector 5. According to the present invention, the objective lens 4 and quadrant type photodetector 5 are moved integrally, and no offset occurs due to the relative positional deviation of objective lens 4 and quadrant type photodetector 5. Therefore, DC offset generated on the outputs {(Sa+Sd)+(Sb+Sc)} might as well be regarded as caused by the disk tilt.

Because the quadrant type photodetector 5 for detecting the tracking error signal is simultaneously used for the generation of the disk tilt detecting signal, there is no need to provide an exclusive detector, which has hindered compact design of pickup in the past. This contributes to the compact design of the pickup P and to the reduction of the manufacturing cost.

The added outputs (Sa+Sd) and (Sb+Sc) of the adders 8 and 9 are further supplied to the adder 21, and the sum of two outputs is obtained. The total sum of the outputs {(Sa+Sd)+(Sb+Sc)} of the photoelectric conversion elements 5a-5d are supplied to the reproduction processing system as the reading RF signal, and it is supplied to an input (b) of the sample pulse generating circuit 23 through an envelope detection circuit 22. The sample pulse generating circuit 23 uses the tracking error signal as another input (a) and generates the sample pulse (c) of the sample hold circuit 18 at zero-cross timing of the tracking error signal (a) according to the tracking error signal (a) and RF envelope signal (b) on on-track state, i.e. when the information reading beam spot is on the recording track.

When the differential output {(Sa+Sd)−(Sb+Sc)} is held by sample hold at zero-cross timing of the tracking error signal (a) on on-track state with the tracking servo loop in open state and when DC component of the hold output is issued as the disk tilt signal, an accurate disk tilt detecting signal can be obtained even when the tracking servo loop is in open state as during searching.

Figure 6:
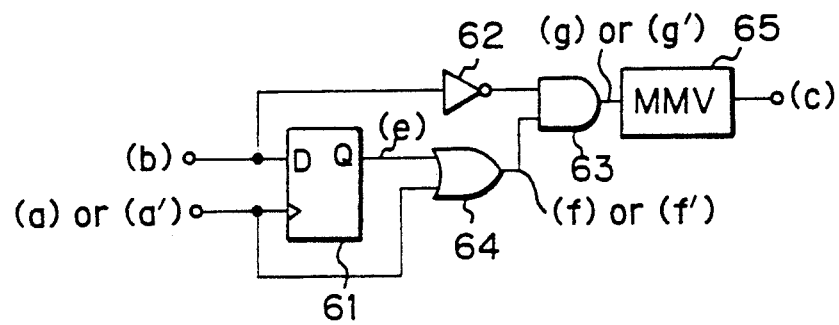

FIG. 5 and FIG. 6 show actual arrangements of sample pulse generating circuit 23.

In FIG. 5, RF envelope signal (a) is supplied to CL (clear) inputs of D-FF (flip-flop) 51 and 52, and the tracking error signal (a) or (a') is supplied to a clock input of D-FF 51. It is further inverted by the inverter 53 and is supplied to a clock input of D-FF 52. Q outputs of D-FF 51 and 52 are suuplied to a trigger input of MMV (monostable multivibrator) 55 through OR gate 55. Then, the output pulse of this MMV 55 becomes the sample pulse (c).

On the other hand, in FIG. 6, RF envelope signal (b) is supplied to a D input of D-FF 61, and it is further inverted by the inverter 62 and is supplied to an input of AND gate 63. The tracking error signal (a) or (a') is supplied to a clock input of D-FF 62 and becomes an input of EX-OR gate 64. Q output of D-FF 61 is supplied to another input of EX-OR gate 64, and the output of EX-OR gate 64 is supplied to another input of AND gate 63. The output of AND gate 63 is supplied to a trigger input of MMV 65. The output pulse of this MMV 65 is turned to sample pulse (c).

Figure 7:
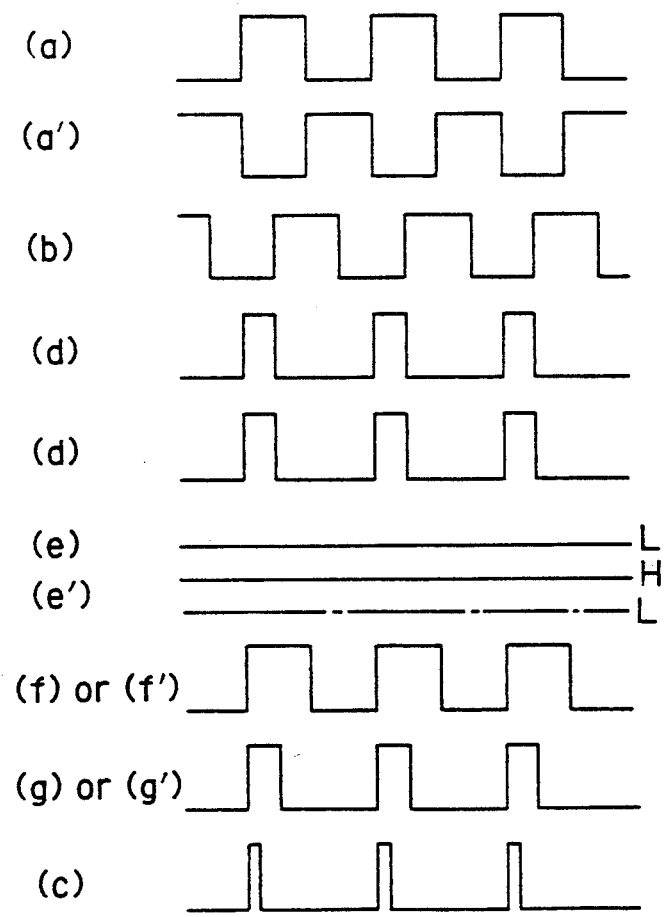
FIG. 7 shows operating waveforms of the circuits of FIG. 5 and FIG. 6.

FIG. 7 shows operating waveforms of the circuits of FIG. 5 and FIG. 6. (a)–(g) or (g') represent the waveforms of the signals (a)–(g) or (g') in each of these figures.

In the above embodiment, description has been given to the case where the tracking error signal is generated by the time difference method in a so-called beam system using the quadrant type photodetector 5, whereas the generation of the tracking error signal is not limited to the time difference method, and the so-called 3-beam method as widely known may be used. In case photodetector 5 is not simultaneously used for the generation of the tracking error signal as in the case of 3-beam method, there is no need to use the quadrant type photodetector as the photodetector 5, and 2-division photodetector may be used, which consists of a pair of photoelectric conversion elements with the light receiving surface divided into two parts by division line along the direction of the recording track.

Also, a straight line is used as the division line of the photodetector in the above embodiment, while the present invention is not limited to this. As disclosed in the Japanese Provisional Patent Publication No. 63-285732, the photodetector may be divided by a curve, which is produced by projecting the straight line in parallel or perpendicular to the recording track on the disk on the photodetector through objective lens or optical component, generating astigmatism for focusing.

As described above, in the optical disk player of this invention, a photodetector consisting of at least a pair of photoelectric conversion elements divided into two parts along the direction of the recording track provided as the photodetector of the pickup, and the differential output of the light receiving outputs of the pair of photoelectric conversion elements is obtained when tracking servo loop is in closed state, and this is issued as the disk tilt detecting signal. Accordingly, there is no need to use a special-purpose sensor, which has been an obstacle in achieving compact design of the pickup. This contributes to compact design of the pickup and to the reduction of manufacturing cost. Also, accurate detection can be accomplished because detection unit is on the optical axis.

What is claimed is:

1. An optical disk player, comprising:
    a pickup having an objective lens for converging an irradiated light beam on an information recording surface of a disk and with a photodetector for receiving a reflected light beam from said information recording surface through the objective lens, said objective lens and said photodetector being integrally and movably arranged;
    a tracking servo unit operating on a tracking error signal produced by a time difference detection method, said tracking servo unit comprising a servo loop, said servo loop including means for generating said tracking error signal by detecting a phase variation component of output signals of said photodetector varying with the deviation of said irradiated light beam spot in a radial direction of the disk relative to a recording track of the disk, and means for deviating said irradiated light beam spot in the radial direction of the disk according to the tracking error signal; and
    a tilt servo unit for controlling said irradiated light beam so as to be perpendicular to an optical axis of said information recording surface according to a disk tilt detecting signal, said tilt servo unit comprising disk tilt detecting means responsive only to said photodetector for generating the disk tilt detecting signal by detecting the tilt of said information recording surface relative to the optical axis of said irradiated light beam;
    wherein said photodetector consists of at least a pair of photoelectric conversion elements arranged so that said photodetector is divided into two parts along the direction of said recording track, and said disk tilt detecting means issues a differential output of light receiving outputs of said pair of photoelectric conversion elements when said servo loop of said tracking servo unit is in a closed state for generating said tracking error signal and issues said differential output as said disk tilt detecting signal.

2. An optical disk player as claimed in claim 1, wherein said photodetector comprises four photoelectric conversion elements and said pair of photoelectric conversion elements are further divided along a direction perpendicular to said recording track;
    said tracking error signal generating means detects a phase variation component varying according to said deviation from a phase difference generated between the outputs of said four photoelectric conversion elements, and issues the phase variation component as said tracking error signal; and
    said disk tilt detecting means obtains said differential output from sums of the outputs of pairs of said photoelectric conversion elements divided along the direction of said recording track, of said four photoelectric conversion elements, and issues said disk tilt detecting signal.

3. An optical disk player as claimed in claim 2, wherein means for issuing a sum total of the outputs of said four photoelectric conversion elements is provided as reading RF signal.

4. An optical disk player as claimed in claim 1, wherein said disk tilt detecting means is provided with sample hold means for sample-holding said differential output at a zero-cross timing of said tracking error signal when said irradiated light beam spot is on said recording track with said servo loop in an open state, and a sample hold output of the sample hold means is issued as said disk tilt detecting signal.

5. An optical disk player as claimed in claim 2, wherein said disk tilt detecting means is provided with sample hold means for sample-holding said differential output at a zero-cross timing of said tracking error signal when said irradiated light beam spot is on said recording track with said servo loop in an open state, and a sample hold output of the sample hold means is issued as said disk tilt detecting signal.

* * * * *